(12) United States Patent
Hammon

(10) Patent No.: US 7,147,812 B2
(45) Date of Patent: Dec. 12, 2006

(54) INPUT/OUTPUT ACCESS SHIELD MEMBER FOR COMPUTER HOUSING

(75) Inventor: Donald M. Hammon, Fox Island, WA (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 11/048,372

(22) Filed: Feb. 1, 2005

(65) Prior Publication Data

US 2006/0170129 A1 Aug. 3, 2006

(51) Int. Cl.
*H05K 9/00* (2006.01)

(52) U.S. Cl. .................. 264/135; 174/382; 174/371

(58) Field of Classification Search .............. 174/35 R, 174/35 MS, 35 GC; 361/816, 818, 800; 264/135, 271.1

See application file for complete search history.

(56) References Cited

U.S. PATENT DOCUMENTS

| | | | | |
|---|---|---|---|---|
| 4,678,699 A | * | 7/1987 | Kritchevsky et al. | 428/175 |
| 5,347,430 A | * | 9/1994 | Curlee et al. | 361/816 |
| 5,646,369 A | * | 7/1997 | Miska et al. | 174/35 GC |
| 5,712,449 A | * | 1/1998 | Miska et al. | 174/35 GC |
| 6,207,089 B1 | * | 3/2001 | Chuang | 264/135 |
| 6,398,899 B1 | * | 6/2002 | Umezawa et al. | 156/245 |
| 6,593,524 B1 | * | 7/2003 | Toedtman | 174/35 R |
| 6,682,674 B1 | * | 1/2004 | Sandevi et al. | 264/135 |
| 6,768,654 B1 | * | 7/2004 | Arnold et al. | 361/818 |
| 6,818,305 B1 | * | 11/2004 | Murar et al. | 428/412 |
| 6,841,107 B1 | * | 1/2005 | Peters et al. | 264/135 |
| 2002/0071940 A1 | * | 6/2002 | Arnold et al. | 428/195 |
| 2004/0104509 A1 | * | 6/2004 | Nakada | 264/259 |

* cited by examiner

*Primary Examiner*—Hung V. Ngo
(74) *Attorney, Agent, or Firm*—Buckley, Maschoff & Talwalkar LLC

(57) ABSTRACT

A shield member for installation on a computer housing includes a generally planar plastic body. The plastic body has at least one opening formed therein to accommodate insertion through the body of at least one computer input/output cable. The shield member also includes a plurality of attachment members integrally formed with the plastic body to attach the shield member to the computer housing. In addition, the shield member includes an electrically-conductive film molded into the plastic body.

6 Claims, 4 Drawing Sheets

INPUT/OUTPUT ACCESS SHIELD MEMBER FOR COMPUTER HOUSING

BACKGROUND

In the case of many personal computers, electronic components are contained within a housing. The rear wall of the housing is typically constituted by a thin metal shield, sometimes referred to as an "I/O shield". This term may be considered short-hand for an input/output access shield. The I/O shield typically has openings formed therein to allow input/output cables to be inserted through the I/O shield to allow the cables to be interfaced to the electronic components within the housing. Because the shield is metal it may function to inhibit electromagnetic interference (EMI) signals from passing through the shield.

The cost of manufacturing conventional I/O shields may be higher than is desirable. Furthermore, it may be inconvenient to mount conventional I/O shields to the balance of the housing.

DETAILED DESCRIPTION

Figure 1:
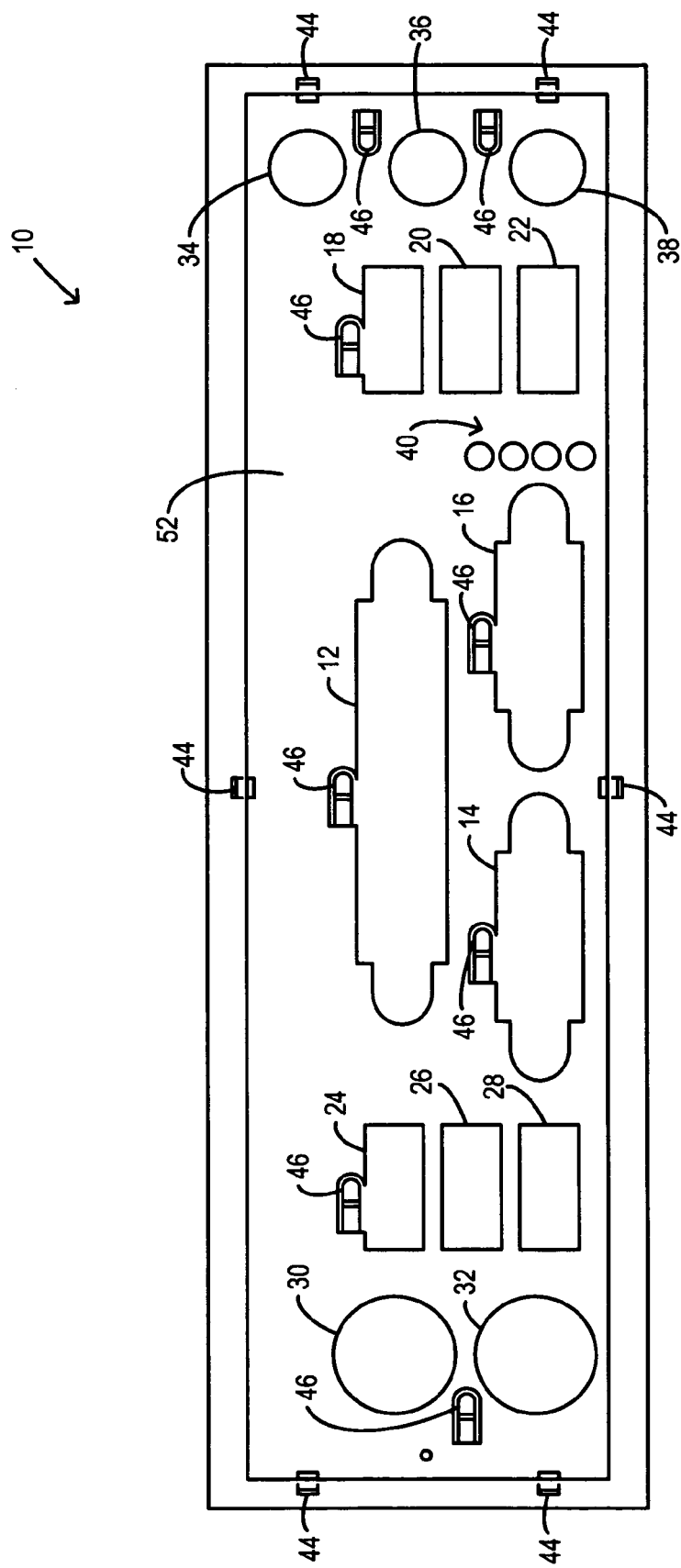
FIG. 1 is an elevational view of an I/O shield member according to some embodiments.
Figure 2:
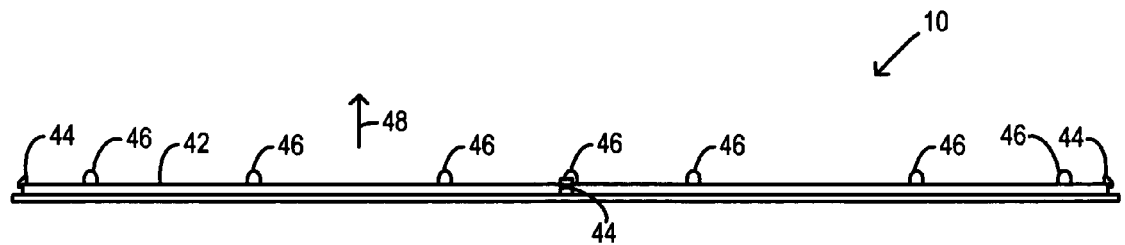
FIG. 2 is a top view of the I/O shield member of FIG. 1
Figure 3:
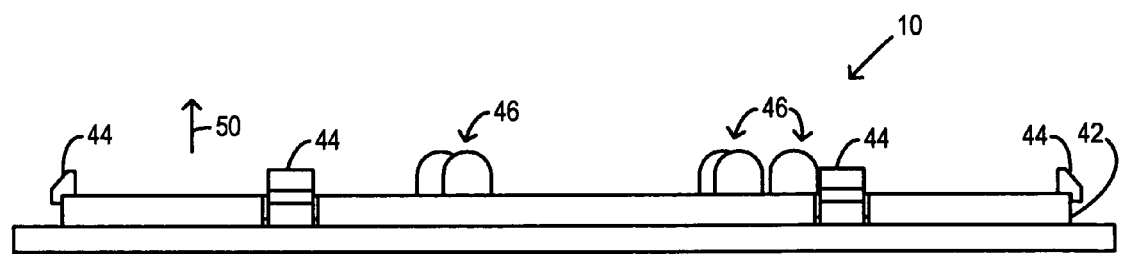
FIG. 3 is an end-on view of the I/O shield member of FIGS. 1 and 2.

FIG. 1 is an elevational view of an I/O shield member 10 as provided in accordance with some embodiments. For convenience of presentation, the shield member 10 is shown in FIG. 1 with its longest dimension oriented horizontally. However, in at least some cases, the longest dimension of the shield member 10 may be oriented vertically, so that the shield member 10 may be suitable for closing the rear of a conventional personal computer "tower" housing. FIGS. 2 and 3 are other views of the shield member 10, with FIG. 2 being a top view and FIG. 3 being a view of an end of the shield member 10.

As seen from FIGS. 1–3, the shield member 10 is in the general form of a planar body with a rectangular profile. The shield member 10 has a number of openings formed therethrough, including openings 12, 14 and 16 (seen in FIG. 1) for accommodating computer input/output cables (not shown) to be inserted through the openings and thus through the shield member 10 to allow the cables to be interfaced to internal electronic components (not shown) housed within a computer housing (not shown in FIGS. 1–3) to which the shield member 10 may be installed. For example, openings 12, 14, 16 may accommodate plugs from devices such as printers or scanners. The openings formed through the shield member 10 further include openings 18, 20, 22, 24, 26, 28, 30, 32, 34, 36, 38 and 40 for accommodating connections to devices such as mice, keypads and USB ports. In other embodiments, the numbers, shapes and/or locations of the openings may be different from those shown in FIG. 1.

The shield member 10 further includes a flange 42 (best seen in FIGS. 2 and 3) which runs around the periphery of the shield member 10 and which extends normal to the plane of the shield member in a direction that is inward relative to a computer housing (not shown in FIGS. 1–3) to which the shield member 10 may be installed. The extent of the flange 42 in the inward direction may be on the order of 1 to 2 mm, in some embodiments. The flange 42, and indeed all other features of the shield member 10 illustrated in FIGS. 1–3, may be integrally formed with shield member 10.

The shield member 10 may also include snap members 44 formed at respective points along the flange 44. The snap members 44 are six in number in the embodiment shown, though there may be more or fewer in other embodiments, and the locations thereof may be changed. The snap members 44 extend normal to the plane of the shield member 10 in the above-mentioned inward direction relative to the computer housing (not shown in FIGS. 1–3) to which the shield member 10 may be installed. The snap members 44 may operate as attachment members by which the shield member 10 may be attached and/or secured to the computer housing. In other embodiments, some or all of the snap members may be dispensed with in favor of small spherical domes (not shown) which may be formed on the flange 42 extending radially outwardly from the flange 42 to allow the shield member 10 to be attached/secured to the computer housing via the spherical domes.

The shield member 10 may also include contact members 46 located at various locations across the planar extent of the shield member 10. The contact members 46 may be rounded and may extend in the above-mentioned inward direction normal to the plane of the shield member 10. In some cases the contact members 46 may be associated with some of the openings (e.g., openings 12, 14, 16) formed in the shield member 10. A purpose of the contact members 46 is to be in electrically conductive contact with one or more circuit boards (not shown in FIGS. 1–3) installed within the computer housing (not shown in FIGS. 1–3) to which the shield member 10 may be installed. For that purpose, as will be explained below, at least the inward-facing surfaces (inward direction indicated by arrows 48, 50 in FIGS. 2 and 3 respectively) of the contact members 46 may be electrically conductive.

As indicated by the above description of the shield member 10 and the accompanying drawings, the shield member 10 may be configured to be attached to a computer housing (FIG. 6) from outside the computer housing.

Figure 4:
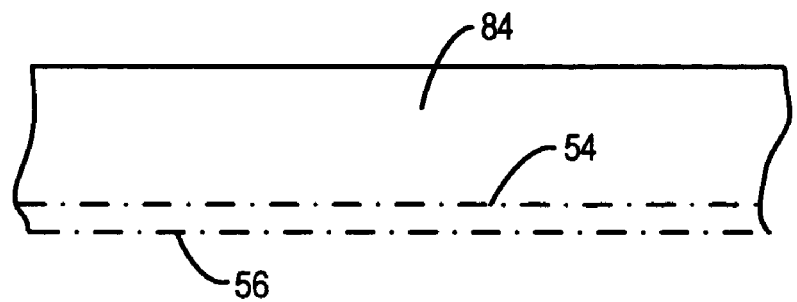
FIG. 4 is a schematic cross-sectional view of the I/O shield member of FIGS. 1–3

The composition of the shield member 10 will now be discussed. FIG. 4 is a schematic partial cross-sectional view taken normal to the plane of the shield member 10 at a location (e.g., location 52, FIG. 1) that is without features. According to some embodiments, the shield member 10 is formed as a molded plastic body into which an electrically-conductive film 54 (FIG. 4) has been molded. It will be noted that the electrically-conductive film 54 is at an inner surface 56 (relative to the above-mentioned computer housing) of the plastic body which makes up the shield member 10. Thus the inner surface 56 of the shield member 10 may be considered to correspond to the electrically-conductive film 54. The extent of the electrically-conductive film 54 in the plane of the shield member 10 may be substantially the same as (i.e., may substantially match) the planar extent of the shield member 10. Thus the surface area of the electrically conductive film 54 may be substantially the same as, and thus may substantially match, the surface area of the inner surface 56 of the shield member 10. The electrically conductive film 54 may be suitable for blocking electromagnetic interference from entering or leaving a computer housing (not shown in FIG. 4) of which the shield member 10 may be a part. Hence, the electrically conductive film 54 may be referred to as an "EMI film".

The shield member 10 may be molded out of conventional plastic resin. The electrically conductive film 54 may be, for example, a metallized Lexan (polycarbonate) sheet available from General Electric plastics division. It will be noted that FIG. 4 is not necessarily drawn to scale, and that the electrically-conductive sheet may be much thinner than is suggested by the drawing. In some embodiments, the typical over-all thickness of the shield member 10 (e.g., at a featureless location such as location 52, FIG. 1) may be on the order of about 0.5 to 1.0 mm.

Figure 5:
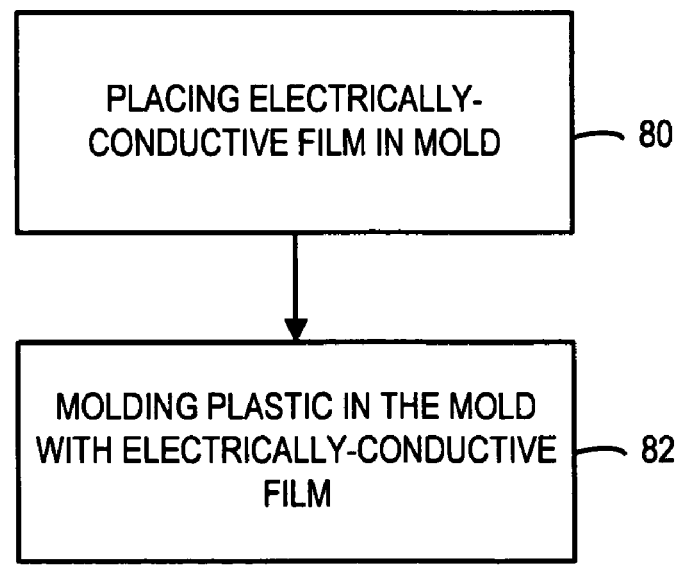
FIG. 5 is a flow diagram that illustrates a process for manufacturing the I/O shield member of FIGS. 1–4 according to some embodiments.

FIG. 5 is a block diagram that illustrates a process that may be performed in the course of manufacturing the shield member 10. At 80 in FIG. 5, the electrically-conductive film (previously indicated as 54 in FIG. 4) is placed in a suitable mold (not shown). Then, at 82 in FIG. 5, a plastic resin or the like is molded in the mold with the electrically-conductive film to form the plastic body 84 partially indicated in FIG. 4, so that the electrically conductive film 54 is molded into the plastic body 84. The mold may be suitably sized and shaped to form the shield member 10 described above. In some embodiments, the molding performed at 82 may be injection molding.

Figure 6:
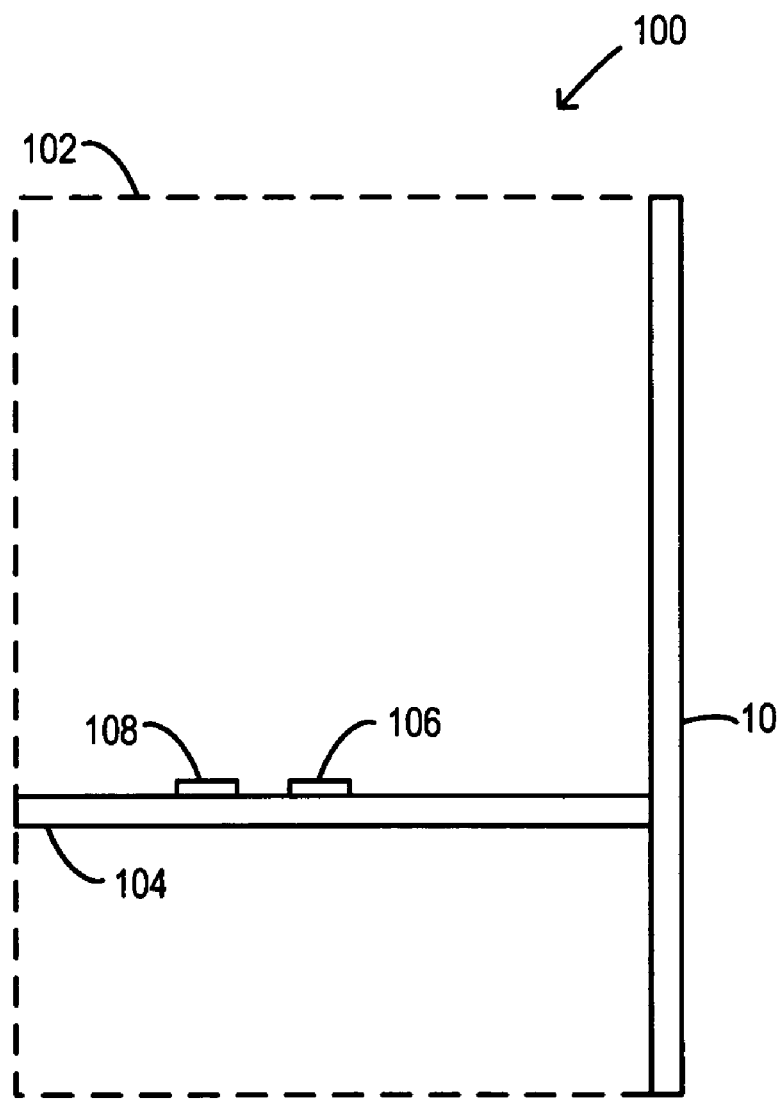
FIG. 6 is a schematic side view of a computer system that includes the I/O shield member of FIGS. 1–4.

FIG. 6 is a schematic side view of a computer system 100 provided in accordance with some embodiments. (To simplify the drawing, many components of the computer system are omitted.) The computer system 100 may include a housing 102 and a circuit board 104 mounted in the housing 102. The circuit board 104 may include at least one integrated circuit, such as microprocessor 106 mounted on the circuit board 104. The circuit board may also include a chipset 108 in communication with the microprocessor 106.

The computer system 100 may further include an I/O shield member 10 like that described above. The shield member 10 may be installed on the housing 102 and may form the rear wall thereof. The shield member 10 may be in electrically-conductive contact with the circuit board 104 via, e.g., its contact members 46 (FIGS. 2 and 3) and its electrically conductive film 54 which forms a surface of the contact members 46. Other components that may, but need not, be included in the computer system 100, and which are not shown, include (a) I/O cables inserted through the shield member 10 to be in electrically conductive contact with the circuit board 104 and/or other internal components of the computer system 100; and/or (b) peripheral components of the computer system 100 coupled to the circuit board 104 via the I/O cables.

The shield member as described hereinabove, made largely of plastic with an electrically-conductive film molded therein, may be manufactured more economically than a conventional metal I/O shield. Moreover, the shield member may be configured so as to be installable on the computer housing from the outside of the housing rather than from the inside, the latter being the case with respect to at least some conventional I/O shields. This feature of the shield member described herein may make assembly of the computer more convenient. Furthermore, the shield member as described herein may be more resistant to vibration than a conventional metal I/O shield and thus may be more reliably retained in place on the computer housing. Because of the presence of the electrically-conductive film in the shield member described herein, the shield member may be substantially as effective as a metal I/O shield in preventing transmission of electromagnetic interference to/from the interior of the computer housing.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   placing an electrically-conductive film in a mold; and
   molding plastic in said mold so that said film is molded into a plastic body, the mold shaped to form a shield member for installation on a computer housing, said plastic body having at least one opening formed therein to accommodate insertion through said body of at least one computer input/output cable, said shield member further comprising at least one attachment member associated with the plastic body to attach the shield member to the computer housing.

2. The method of claim 1, wherein the electrically conductive film has a substantially planar extent that substantially matches a planar extent of said plastic body.

3. The method of claim 1, wherein the plastic body includes a flange which runs around a periphery of the plastic body, said flange extending normal to a plane of the plastic body, the at least one attachment member comprising a plurality of snap members integrally formed with the plastic body along said flange.

4. The method of claim 1, wherein the shield member further includes contact members integrally formed with said plastic body to contact at least one circuit board mounted in said computer housing.

5. The method of claim 4, wherein said contact members extend normal to a surface of said plastic body, said surface corresponding to said electrically-conductive film.

6. The method of claim 1, wherein said electrically-conductive film comprises metallized polycarbonate.

* * * * *